(12) United States Patent
Stevens et al.

(10) Patent No.: US 9,559,514 B2
(45) Date of Patent: *Jan. 31, 2017

(54) METHODS, APPARATUSES AND SYSTEMS FOR MONITORING FOR EXPOSURE OF ELECTRONIC DEVICES TO MOISTURE AND REACTING TO EXPOSURE OF ELECTRONIC DEVICES TO MOISTURE

(71) Applicant: HZO, Inc., Draper, UT (US)

(72) Inventors: Blake Stevens, Morristown, NJ (US); Max Sorenson, Herriman, UT (US)

(73) Assignee: HZO, Inc., Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/788,436

(22) Filed: Jun. 30, 2015

(65) Prior Publication Data

US 2015/0303680 A1  Oct. 22, 2015

Related U.S. Application Data

(63) Continuation of application No. 13/734,779, filed on Jan. 4, 2013, now Pat. No. 9,071,046.

(Continued)

(51) Int. Cl.
*G08B 21/00* (2006.01)
*H02H 5/08* (2006.01)
(Continued)

(52) U.S. Cl.
CPC ............ *H02H 5/083* (2013.01); *G06F 1/1656* (2013.01); *G06F 1/28* (2013.01); *H02H 5/00* (2013.01)

(58) Field of Classification Search
CPC ....... G08B 19/00; G08B 21/182; G08B 21/20; G08B 23/00; H04W 52/0209
(Continued)

(56) References Cited

U.S. PATENT DOCUMENTS 3,898,547 A    8/1975  Poole
4,631,250 A   12/1986  Hayashi
(Continued)

FOREIGN PATENT DOCUMENTS

CN    1567554 A    1/2005
CN   102150480 A    8/2011
(Continued)

OTHER PUBLICATIONS

Bott et al., "Windows 7, Official Manual," vol. 2, Nikkei BP, Apr. 24, 2010, First Edition, pp. 315-316, book.
(Continued)

*Primary Examiner* — Phung Nguyen
(74) *Attorney, Agent, or Firm* — Lunzler Law Group

(57) ABSTRACT

Systems and methods for monitoring the moisture to which an electronic device is exposed may alter or vary operation of the electronic device. Operation of the electronic device may be altered or varied to provide a notification that the electronic device has been exposed to moisture. When an electronic device is exposed to moisture, an operational mode of the electronic device may be changed. A change in the operational mode of the electronic device may include termination of the supply of power to one or more components, which may protect those components. Programs or apps that provide a user of the electronic device with information regarding exposure of the electronic device to an amount of moisture that meets or exceeds a moisture response threshold are also disclosed.

21 Claims, 1 Drawing Sheet

Related U.S. Application Data

(60) Provisional application No. 61/584,933, filed on Jan. 10, 2012.

(51) Int. Cl.
*H02H 5/00* (2006.01)
*G06F 1/16* (2006.01)
*G06F 1/28* (2006.01)

(58) Field of Classification Search
USPC .... 340/604, 605, 620, 618, 815.4; 361/1, 71
See application file for complete search history.

(56) References Cited

U.S. PATENT DOCUMENTS

| | | | |
|---|---|---|---|
| 4,994,726 A | 2/1991 | Tamura et al. | |
| 5,184,427 A | 2/1993 | Armstrong | |
| 5,291,118 A | 3/1994 | Kojima | |
| 5,818,340 A | 10/1998 | Yankielun et al. | |
| 5,865,635 A | 2/1999 | Hsiang et al. | |
| 5,999,384 A | 12/1999 | Chen et al. | |
| 6,061,261 A | 5/2000 | Chen et al. | |
| 6,138,349 A | 10/2000 | Vinciarelli et al. | |
| 6,157,303 A * | 12/2000 | Bodie | G08B 21/088 340/539.1 |
| 6,157,765 A | 12/2000 | Bruce et al. | |
| 6,445,086 B1 | 9/2002 | Houston | |
| 6,526,807 B1 | 3/2003 | Doumit et al. | |
| 6,552,888 B2 | 4/2003 | Weinberger | |
| 7,050,837 B2 * | 5/2006 | Menz | H04M 1/18 219/501 |
| 7,332,834 B2 | 2/2008 | Lee | |
| 7,411,317 B2 | 8/2008 | Liu | |
| 7,446,432 B2 | 11/2008 | Cha | |
| 7,481,107 B2 | 1/2009 | Itakura et al. | |
| 7,550,873 B2 | 6/2009 | Jiang et al. | |
| 7,795,759 B2 | 9/2010 | DuBose et al. | |
| 7,800,252 B2 | 9/2010 | DuBose et al. | |
| 7,880,591 B2 * | 2/2011 | Johnson | G06F 21/554 340/11.1 |
| 7,897,881 B2 | 3/2011 | Kaspar et al. | |
| 7,960,944 B2 | 6/2011 | Hoffman et al. | |
| 7,977,823 B2 | 7/2011 | DuBose et al. | |
| 7,978,447 B2 | 7/2011 | Baxter | |
| 7,990,670 B2 | 8/2011 | Chen | |
| 8,000,858 B2 | 8/2011 | Tonegawa et al. | |
| 8,030,890 B2 | 10/2011 | Hyatt | |
| 8,063,765 B2 * | 11/2011 | Johnson | G06F 21/554 307/116 |
| 8,169,196 B2 | 5/2012 | Vantu et al. | |
| 8,198,757 B2 | 6/2012 | Brink et al. | |
| 8,259,221 B1 | 9/2012 | Kaplan et al. | |
| 8,368,350 B2 | 2/2013 | Iwanaga et al. | |
| 8,374,729 B2 | 2/2013 | Chapel et al. | |
| 8,519,566 B2 | 8/2013 | Recker et al. | |
| 8,698,641 B2 | 4/2014 | Abraham et al. | |
| 8,886,971 B2 | 11/2014 | Chuang | |
| 2002/0074970 A1 | 6/2002 | Kawashima | |
| 2002/0097546 A1 | 7/2002 | Weinberger | |
| 2002/0101695 A1 | 8/2002 | Saksa | |
| 2002/0112945 A1 | 8/2002 | Lawson et al. | |
| 2002/0170897 A1 | 11/2002 | Hall | |
| 2002/0187260 A1 | 12/2002 | Sheppard et al. | |
| 2004/0130288 A1 | 7/2004 | Souther et al. | |
| 2004/0257037 A1 | 12/2004 | Hartung et al. | |
| 2005/0179140 A1 | 8/2005 | Goodner et al. | |
| 2005/0267698 A1 | 12/2005 | Gordon | |
| 2006/0036885 A1 | 2/2006 | Hsieh | |
| 2006/0125434 A1 | 6/2006 | Frohne et al. | |
| 2006/0181241 A1 | 8/2006 | Veselic | |
| 2006/0186901 A1 | 8/2006 | Itakura et al. | |
| 2006/0208914 A1 * | 9/2006 | Liu | H04M 1/18 340/620 |
| 2006/0264153 A1 | 11/2006 | Jaubertie | |
| 2007/0038334 A1 | 2/2007 | Chou et al. | |
| 2007/0046106 A1 | 3/2007 | Shintomi | |
| 2007/0062027 A1 | 3/2007 | Ripamonti et al. | |
| 2007/0182368 A1 | 8/2007 | Yang | |
| 2007/0254697 A1 | 11/2007 | Sugio et al. | |
| 2008/0088462 A1 | 4/2008 | Breed | |
| 2008/0164768 A1 | 7/2008 | Litwack | |
| 2008/0204128 A1 | 8/2008 | Brenner et al. | |
| 2008/0204218 A1 | 8/2008 | Tupman et al. | |
| 2008/0283180 A1 | 11/2008 | Bachman et al. | |
| 2009/0001938 A1 | 1/2009 | Vantu et al. | |
| 2009/0015372 A1 | 1/2009 | Kady | |
| 2009/0119520 A1 | 5/2009 | Yoshioka et al. | |
| 2009/0122633 A1 | 5/2009 | Roewer | |
| 2009/0129128 A1 | 5/2009 | Hirahara | |
| 2009/0160404 A1 | 6/2009 | Iwai | |
| 2009/0207031 A1 | 8/2009 | Barth et al. | |
| 2009/0263581 A1 | 10/2009 | Martin, III et al. | |
| 2009/0263641 A1 | 10/2009 | Martin, III et al. | |
| 2010/0033883 A1 * | 2/2010 | Simon | H02H 5/083 361/52 |
| 2010/0159699 A1 | 6/2010 | Takahashi | |
| 2010/0176956 A1 | 7/2010 | Moerschell | |
| 2010/0270860 A1 | 10/2010 | Kamaga | |
| 2010/0302757 A1 | 12/2010 | Bennett, Jr. | |
| 2010/0304091 A1 * | 12/2010 | Wang | G09F 3/0291 428/172 |
| 2011/0064737 A1 | 3/2011 | Agus | |
| 2011/0104940 A1 | 5/2011 | Rabu et al. | |
| 2011/0121985 A1 | 5/2011 | Yamamoto | |
| 2011/0131003 A1 | 6/2011 | Tusvik | |
| 2011/0141205 A1 | 6/2011 | Gerner et al. | |
| 2011/0147174 A1 | 6/2011 | Chuang | |
| 2011/0161694 A1 | 6/2011 | Fujiwara | |
| 2011/0208993 A1 | 8/2011 | Samoilova et al. | |
| 2011/0253429 A1 | 10/2011 | Humphries et al. | |
| 2011/0262740 A1 | 10/2011 | Martin, III et al. | |
| 2011/0264398 A1 | 10/2011 | Niewczas et al. | |
| 2011/0279931 A1 | 11/2011 | Nakamura | |
| 2012/0194952 A1 | 8/2012 | Crucs | |
| 2012/0231841 A1 | 9/2012 | Niederberger et al. | |
| 2012/0286949 A1 | 11/2012 | Worthington et al. | |
| 2013/0111100 A1 | 5/2013 | Ghosh et al. | |
| 2013/0162198 A1 | 6/2013 | Yokota et al. | |
| 2013/0174410 A1 | 7/2013 | Stevens et al. | |
| 2013/0176691 A1 | 7/2013 | Stevens et al. | |
| 2013/0176700 A1 | 7/2013 | Stevens et al. | |
| 2013/0182360 A1 | 7/2013 | Stevens et al. | |
| 2013/0225237 A1 * | 8/2013 | Minami | H04W 52/0245 455/556.1 |
| 2013/0286567 A1 | 10/2013 | Sorenson et al. | |
| 2013/0290764 A1 | 10/2013 | Taki | |
| 2013/0295782 A1 | 11/2013 | Goel | |
| 2013/0335898 A1 | 12/2013 | Stevens et al. | |
| 2014/0075212 A1 | 3/2014 | Urbina et al. | |
| 2015/0016000 A1 | 1/2015 | Quirk et al. | |

FOREIGN PATENT DOCUMENTS

| | | |
|---|---|---|
| CN | 202049235 U | 11/2011 |
| CN | 102655949 A | 9/2012 |
| DE | 10203815 C1 | 4/2003 |
| EP | 1621874 A1 | 2/2006 |
| JP | 62-187258 A | 8/1987 |
| JP | 01-170311 A | 7/1989 |
| JP | 07-302808 A | 11/1995 |
| JP | 09-107327 | 4/1997 |
| JP | 2000-505216 A | 4/2000 |
| JP | 2000-299066 A | 10/2000 |
| JP | 2002-042273 A | 2/2002 |
| JP | 2002-111838 A | 4/2002 |
| JP | 2002-329552 A | 11/2002 |
| JP | 2003-115949 A | 4/2003 |
| JP | 2003-524362 A | 8/2003 |
| JP | 2004-235724 A | 8/2004 |
| JP | 2004-297629 A | 10/2004 |
| JP | 2005-079225 A | 3/2005 |
| JP | 2005-172083 A | 6/2005 |
| JP | 2006-277129 A | 10/2006 |

(56) References Cited

FOREIGN PATENT DOCUMENTS

| | | |
|---|---|---|
| JP | 2007-279616 A | 10/2007 |
| JP | 2008-018476 A | 1/2008 |
| JP | 2009-505386 A | 2/2009 |
| JP | 04274598 B2 | 6/2009 |
| JP | 2009-178805 A | 8/2009 |
| JP | 2009-529276 A | 8/2009 |
| JP | 2009-259937 A | 11/2009 |
| JP | 2009-292135 A | 12/2009 |
| JP | 2010-011205 A | 1/2010 |
| JP | 2010-035036 A | 2/2010 |
| JP | 2010-225715 A | 10/2010 |
| JP | 2011-171894 A | 9/2011 |
| JP | 2012-500487 A | 1/2012 |
| JP | 2012-074798 A | 4/2012 |
| KR | 20100006616 U | 6/2010 |
| WO | 97/26634 A1 | 7/1997 |
| WO | 03/065691 A2 | 8/2003 |
| WO | 2006/028030 A1 | 3/2006 |
| WO | 2010/020753 A2 | 2/2010 |
| WO | 2011/037921 A1 | 3/2011 |
| WO | 2011/064737 A2 | 6/2011 |
| WO | 2012/108443 A1 | 8/2012 |
| WO | 2014/110106 A1 | 7/2014 |

OTHER PUBLICATIONS

Matthew Braga, "Stay dry: Where to find your phone's water sensors," tested.com, Aug. 16, 2010, website available at: http://www.tested.com/tech/smartphones/720-stay-dry-where-to-find-your-phones-water-sensors/.

Neil Hughes, "Apple looking to improve water sensors for detecting iPhone damage," appleinsider.com, Feb. 17, 2012, website available at: http://appleinsider.com/articles/12/02/17/apple_looking_to_improve_water_sensors_for_detecting_iphone_damage.

Kevin Purcell, "How to find your mobile phone's water sensor," notebooks.com, Aug. 16, 2010, website available at: http://notebooks.com/2010/08/16/how-to-find-your-mobile-phones-water-sensor/.

United States Patent and Trademark Office acting as the International Searching Authority, "International Search Report and Written Opinion," mailed Mar. 14, 2013, in related PCT application No. PCT/US2013/020376.

European Patent Office, "Supplementary European Search Report," mailed Sep. 29, 2014 in European Application No. 13736121.8.

Taiwan Intellectual Property Office, "Search Report," Dec. 12, 2014, in Taiwan Patent Application No. 102100828.

State Intellectual Property Office of the People's Republic of China, "Notification of First Office Action and Search Report," mailed Aug. 5, 2015 in Chinese patent application No. 201310068272.0.

* cited by examiner

METHODS, APPARATUSES AND SYSTEMS FOR MONITORING FOR EXPOSURE OF ELECTRONIC DEVICES TO MOISTURE AND REACTING TO EXPOSURE OF ELECTRONIC DEVICES TO MOISTURE

CROSS REFERENCE TO RELATED APPLICATION

This application is a continuation of U.S. patent application Ser. No. 13/734,779, filed on Jan. 4, 2013, and titled METHODS, APPARATUSES AND SYSTEMS FOR MONITORING FOR EXPOSURE OF ELECTRONIC DEVICES TO MOISTURE AND REACTING TO EXPOSURE OF ELECTRONIC DEVICES TO MOISTURE ("the '779 application"), now U.S. Pat. No. 9,071,046, issued Jun. 30, 2015. A claim for the benefit of priority under 35 U.S.C. §119(e) was made in the '779 application to the Jan. 10, 2012, filing date of U.S. Provisional Application No. 61/584,933, titled METHODS, APPARATUS AND SYSTEMS FOR MONITORING AND REACTING TO EXPOSURE OF ELECTRONIC DEVICES TO MOISTURE ("the '933 provisional application"). The entire disclosures of the '779 application and the '933 provisional application are, by this reference, incorporated herein.

TECHNICAL FIELD

This disclosure relates generally to methods and systems for monitoring for the exposure of electronic devices to moisture and for responding to exposure of electronic devices to moisture, and to electronic devices that employ such a method and/or system.

SUMMARY

A system that monitors for the exposure of an electronic device to moisture (e.g., liquid, vapor, etc.) (e.g., as moisture enters the electronic device through an entry point, such as a port, seam or crack; as the device is exposed to air with a high vapor content; etc.) may be configured to alter or vary operation of the electronic device. Similarly, in a method for monitoring for the exposure of an electronic device to moisture, the manner in which the electronic device operates may be varied or altered if a predetermined amount of moisture is detected. Various aspects relating to systems and methods for monitoring for the exposure of electronic devices to moisture are disclosed.

The term "moisture" is used throughout this disclosure to refer to a variety of liquids and vapors. Without limitation, moisture may include water, aqueous solutions (e.g., salt solutions, acidic solutions, basic solutions, drinks, etc.) or vapors of water or other aqueous materials (e.g., humidity, fogs, mists, etc.). Moisture may also include organic liquids and vapors (e.g., organic solvents, low molecular weight organic compounds, etc.), including electrically conductive organic materials, as well as a variety of other substances or conditions that might pose a threat to an electronic device or its components.

In one aspect, the disclosure relates to moisture response systems. A moisture response system may be configured to monitor the amount of moisture to which an electronic device is exposed. A moisture response system may be used in conjunction with or be incorporated into a variety of different types of electronic devices, including, without limitation, portable electronic devices, such as mobile telephones, smart phones, e-readers, tablet computers, laptop computers, and the like; electronic devices that are expected to be used in environments where exposure to moisture is possible or even likely, such as electronic devices used in agricultural equipment, irrigation, public safety, military, the oil and gas industry, transportation (e.g., by railways, in trucking, etc.), maritime applications; and electronic devices that are used in a variety of other applications.

In some embodiments, a moisture response system may include a moisture sensor, a control element, a warning element and a switch. The control element, the warning element, the switch, a power supply for these features and electrical connections and other components of a moisture response system may be made moisture resistant (e.g., covered with a moisture-resistant coating, etc.). The moisture sensor may also be moisture resistant (e.g., portions of the moisture sensor (i.e., the parts that are not configured to detect moisture), may be sealed, covered with a moisture-resistant coating, etc.).

The moisture sensor enables monitoring of the amount of moisture in an environment where the moisture sensor, and any electronic device with which it is associated (or is a part), is located. The moisture sensor may be located within an electronic device, exposed to the interior of the electronic device or exposed to an exterior of the electronic device.

The control element may control operation of other components of the moisture response system. The control element may be dedicated to the moisture response system, or it may comprise a processing element of the electronic device with which the moisture response system is used.

The warning element, which may operate under control of the control element, may be configured to generate one or more signals indicative of exposure of the electronic device to moisture. In some embodiments, the warning element may be configured to notify an individual using the electronic device that the electronic device has been exposed to an above-ambient amount of moisture, that the amount of moisture to which the electronic device has been exposed exceeds a per-exposure threshold, that the cumulative amount of moisture to which the electronic device has been exposed over a period of time (e.g., the life of the electronic device, the past year, the past six months, the past month, etc.) has exceeded a total acceptable exposure amount, the amount of moisture to which the electronic device has been exposed (e.g., the type of moisture to which the electronic device is currently exposed, the amount of moisture to which the electronic device is currently exposed, the amount of time the electronic device was/is exposed to moisture during a particular moisture-exposure event, the total amount of time the electronic device has been exposed to moisture over a period of time (e.g., the life of the electronic device, the past year, the past six months, the past month, etc.), the number of times the electronic device has been exposed to moisture, etc.), other information about exposure of the electronic device to moisture or any combination of the foregoing. Any of the moisture thresholds mentioned above may be referred to herein as a "moisture response threshold." In embodiments where the electronic device is configured for wireless communication (e.g., a mobile telephone, a smart phone, a tablet computing device, a portable digital music player, a radio, a wireless automobile entry device (i.e., key), etc.), the warning element may be configured to notify a remote monitoring service that the electronic device has been exposed to an amount of moisture that meets or exceeds the moisture response threshold.

The switch, which may operate under control of the moisture sensor or the control element, may be configured to move between a normal position and a moisture response position. With the switch in the normal position, the electronic device may operate normally; the switch allows power to flow from a power supply of the electronic device to its primary electronic components (e.g., electronic components that enable the electronic device to function as intended, etc.). In the moisture response position, the switch may terminate the communication of power from a power supply to at least some of the circuitry of the electronic device (e.g., electronic components that enable the electronic device to function as intended, etc.). In some embodiments, when the switch is in its moisture response position, it may allow power to be communicated from the power supply to a remainder of the moisture response system.

In some embodiments, a change in the orientation of the switch may cause a mechanical action in the electronic device that may temporarily seal one or more of its moisture-sensitive components from exposure to the moisture that has been detected.

According to another aspect, an electronic device, such as a portable electronic device of a known type, may additionally include a moisture sensor. The moisture sensor may be associated with other components of the electronic device (e.g., a housing, a display, other user interface components, internal components, a power supply, etc.) in such a way as to monitor exposure of the electronic device, or one or more of its components, to moisture. In some embodiments, the moisture sensor may be part of a moisture response system, which may also include a switch and, in some embodiments, a dedicated control element, a warning element or other features or combinations of features.

In another aspect, methods for responding to exposure of an electronic device to amounts of moisture that meet or exceed the moisture response threshold include monitoring an amount of moisture to which the electronic device is exposed. Monitoring may occur continuously or periodically. If the amount of moisture exceeds a predetermined moisture response threshold, a normal operational mode of the electronic device may be terminated, and a moisture response mode of the electronic device may be initiated.

As an electronic device exits its normal operational mode, the supply of power from a power supply (e.g., a battery, a supercapacitor, a fuel cell, a photovoltaic cell, etc.) to one or more components of the electronic device may be terminated. Termination of the supply of power to these components may protect them from damage (e.g., damage from short circuits that may be caused by water, other types of moisture, etc.). In some embodiments, this moisture-response mode of the electronic device may include a complete shut-down of the electronic device. In other embodiments, the moisture response mode of the electronic device may comprise a safe mode, in which certain components of the electronic device (e.g., components that have been made moisture-resistant, components that are unlikely to fail when exposed to moisture, etc.) may continue to operate. In some embodiments, operation of the electronic device in the safe mode may enable a moisture response system to continue operation, while all other components of the electronic device (i.e., those that do not participate in the moisture response system) may shut down.

As an electronic device enters the safe mode, or moisture response mode, the electronic device or a moisture response system associated with the electronic device may generate a notification. Without limitation, the notification may include a user-perceptible warning, the generation and transmittal of a signal to a remote monitoring service (e.g., by way of an e-mail, an SMS text message, an MMS text message, etc.), or a combination of these services.

In embodiments where moisture monitoring continues while an electronic device is in the moisture response mode, once the amount of moisture to which the electronic device is exposed drops to an acceptable level, the electronic device may be enabled to resume full operation. In such an embodiment, when the amount of moisture detected drops to or below a predetermined reset threshold, which may be the same as or different from the moisture response threshold, the moisture response mode of the electronic device may be terminated, and the normal operational mode of the electronic device may be reinitiated.

Programs or applications (or "apps") that are launched or executed in response to detection of amounts of moisture that meet or exceed a moisture response threshold are also disclosed. Such a program or application may perform functions that relate to exposure of an electronic device to moisture. By way of non-limiting example, a program or application that is executed or launched upon exposure of an electronic device to moisture may provide a user with information about exposure of the electronic device to moisture. Such information may include, but is not limited to, information on the amount of moisture to which an electronic device has been exposed, information on prior exposure of the electronic device to moisture, cumulative moisture exposure information, diagnostic information and/or historic information. As another non-limiting example, a program or application that launches, or executes, upon exposure of an electronic device to an amount of moisture that meets or exceeds a predetermined moisture response threshold may provide a user with information on moisture-resistant elements of the electronic device (e.g., the last time a moisture-resistant coating was applied to components of the electronic device, etc.).

Other aspects, as well as features and advantages of various aspects, of the disclosed subject matter will become apparent to those of ordinary skill in the art though consideration of the ensuing description, the accompanying drawings and the appended claims.

DETAILED DESCRIPTION

Figure 1:
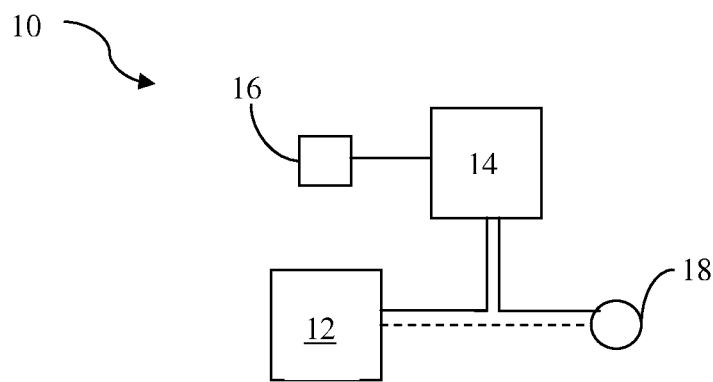
FIG. 1 is a schematic representation of a moisture response system.

With reference to FIG. 1, an embodiment of a moisture response system 10 is illustrated. The moisture response system 10, which is configured for use with an electronic device (e.g., a portable electronic device, an electronic device that is expected to be used in an environment where exposure to moisture is likely or even expected, etc.), may be configured to monitor the amount of moisture to which the electronic device is exposed. In the embodiment illustrated by FIG. 1, the moisture response system 10 includes a moisture sensor 12, a control element 14, a warning element 16 and a switch 18. In some embodiments, the moisture response system 10 may include a dedicated power source (e.g., a capacitor, a supercapacitor, a battery, etc.).

The moisture sensor 12 enables monitoring of the amount of moisture in an environment where the moisture sensor 12 is located. The moisture sensor 12 may be configured for assembly with an electronic device. The moisture sensor 12

(and other components of the moisture response system 10) may be configured to operate regardless of whether the electronic device is powered on (e.g., in embodiments where the moisture response system 10 receives power from a backup power supply of the electronic device, a dedicated power source, etc.). Various embodiments of moisture sensors 12 may be used in a moisture response system 10 that incorporates teachings of this disclosure. As a non-limiting example, the moisture sensor 12 may comprise a digital humidity sensor, such as those available from Silicon Laboratories Inc. of Austin, Tex. (e.g., the SILICON LABS Si7005 humidity and temperature sensor, etc.) and Sensirion AG of Staefa, Switzerland (e.g., Sensirion's model SHT21 digital humidity and temperature sensor, etc.).

The moisture sensor 12 may communicate with the control element 14 of the moisture response system 10. The control element 14 may be configured to process signals from the moisture sensor 12 and, upon detecting signals indicative of certain conditions (e.g., an amount of moisture that meets or exceeds a predetermined moisture response threshold, an amount of moisture at or below a predetermined reset threshold, etc.), execute commands that control operation of other components of the moisture response system 10. The control element 14 may comprise a dedicated processing element (e.g., a microcontroller with embedded firmware, etc.) or it may comprise a processor of an electronic device with which the moisture response system 10 is associated.

One of the components of the moisture response system 10 that may operate under control of the control element 14 is the warning element 16. The warning element 16 may comprise a simple user-perceptible alarm, which may be configured to alert a user of the electronic device of its exposure to moisture. In such an embodiment, the warning element 16 may comprise a visible alarm, an audible alarm, a vibrating alarm or the like. In some embodiments, the warning element 16 may comprise a display or monitor (e.g., the display or monitor of an electronic device with which the moisture response system 10 is associated, or of which the moisture response system 10 is a part, etc.), which may display a warning. In embodiments where the warning element 16 comprises a display or monitor, it may provide a user interface (e.g., display images, receive inputs (when the display or monitor is touch-sensitive), etc.) with the control element 14 while the control element 14 executes a program, or application or "app," in response to detection by the moisture sensor 12 of an amount of moisture that meets or exceeds a moisture response threshold. In embodiments where the control element 14 launches a program or application in response to detection of an amount of moisture that meets or exceeds the moisture response threshold, the warning element 16 may display information that relates to exposure of an electronic device to moisture. By way of non-limiting example, a program or application that is executed or launched upon exposure of an electronic device may provide a user with information about exposure of the electronic device to moisture. Such information may include, but is not limited to, information on the amount of moisture to which an electronic device has been exposed, information on prior exposure of the electronic device to moisture, cumulative moisture exposure information, diagnostic information, historical information, other information that relates to exposure of the electronic device to moisture or combinations of any of the foregoing. The information provided to the user may also be stored locally on the electronic device, and remain available for subsequent access by a user of that electronic device. As another example, a program or application that launches upon exposure of an electronic device to moisture in an amount that meets or exceeds a moisture response threshold may provide a user with information on one or more moisture-resistant features of the electronic device (e.g., the last time a moisture-resistant coating was applied to components of the electronic device, etc.). In another example, the control element 14 may execute a program or an application that provides a user with instructions on how to minimize moisture-related damage to the electronic device with which the moisture response system 10 is associated; e.g., instructions on a protocol for removing moisture from, or drying, the specific electronic device with which the moisture response system 10 is associated. Other examples of information that the control element 14 may cause the warning element 16 to provide to a user include, but are not limited to, warranty information, repair information, advertisements relating to mitigating the effects of potential damage from exposure of the electronic device to moisture and other moisture-related information.

The warning element 16 may comprise a wireless communication element, and may be configured to transmit a signal to a remote monitoring service. Without limitation, such a warning element 16 may comprise a wireless communication element. A wireless communication element may comprise a primary communication element of the electronic device with which the moisture response system 10 is associated, or it may comprise a dedicated wireless communication system. In either embodiment, under control of the control element 14, the warning element 16 may identify an appropriate recipient for information regarding exposure of the electronic device to an above-ambient amount of moisture, and transmit that information to its intended recipient. A wireless communication element may be configured to operate at a frequency in the range of about 100 kHz to about 100 GHz (e.g., 100 MHz to 3 GHz, 100 kHz to 5 GHz, 1 GHz to 70 GHz, etc.). A wireless communication element may be configured to communicate by a radiofrequency (RF) communication scheme, such as GSM, TDMA (time division multiple access), CDMA (code division multiple access), LTE (long term evaluation), 3G, 4G, NFC (near field communications) or the like. Alternatively, a wireless communication element may be configured to communicate by optical means, such as an infrared (IR) signal, an optical local area network (LAN) system, an optical personal area network (PAN) system or the like. Examples of wireless communication elements include, without limitation, radiofrequency (RF) communication components, such as cellular transmitters, Bluetooth transmitters or the like, WiFi transmitters (i.e., systems operating on IEEE 802.xxx protocols) or the like.

The switch 18 may also operate in accordance with signals from the control element 14. Alternatively, the switch 18 may be controlled directly by signals from the moisture sensor 12. In either event, the switch 18 may limit the communication of power from a power supply 20 (FIG. 2) (e.g., a primary battery, a rechargeable battery, a back-up battery, a dedicated battery, a supercapacitor, a fuel cell, a photovoltaic cell, etc.) to moisture-sensitive components (e.g., electronic components, etc.) of the electronic device with which the moisture response system 10 is associated, or of which the moisture response system 10 is a part. In some embodiments, the control element 14 may be configured (e.g., programmed, etc.) to determine the orientation of the switch 18 and, thus, the portions of the electronic device and/or the moisture response system 10 to which power is to be terminated.

The switch 18 may have a normal position, or orientation, and at least one moisture response position, or orientation. When the switch 18 is in the normal position, the electronic device may operate normally; the switch 18 allows power to flow from a power supply 20 (FIG. 2) of the electronic device to its primary electronic components (e.g., electronic components that enable the electronic device to function as intended, etc.). When in a moisture response position, the switch 18 may terminate the communication of power from the power supply 20 to at least some of the circuitry of the electronic device (e.g., electronic components that enable the electronic device to function as intended, one or more communication ports, displays, sensors, cameras, speakers, microphones, etc.). In some embodiments, when the switch 18 is in a moisture response position, it may allow power to be communicated from the power supply 20 to a remainder of the moisture response system 10. If operation of the primary power supply of the electronic device is adversely affected by the moisture, power may be communicated to the remainder of the moisture response system 10 by way of a backup battery, a capacitor, supercapacitor or battery dedicated to the moisture response system 10, etc.

One or more of the control element 14, the warning element 16, the switch 18, the power supply 20 and electrical connections and other components of a moisture response system 10 may be rendered resistant to one or more types of moisture (e.g., to water, aqueous solutions, water vapor, vapors of aqueous solutions, organic liquids or vapors, etc.). For example, one or more of these components may be covered with a moisture-resistant coating 22, such as a coating that is impermeable or substantially impermeable to moisture (e.g., a substituted or unsubstituted poly(p-xylylene) polymer (i.e., a parylene, etc.), etc.) a moisture-repellant coating, etc. The moisture sensor 12 may also be moisture resistant (e.g., portions of the moisture sensor (i.e., the parts that are not configured to detect moisture) may be covered with a moisture-resistant coating, etc.).

Figure 2:
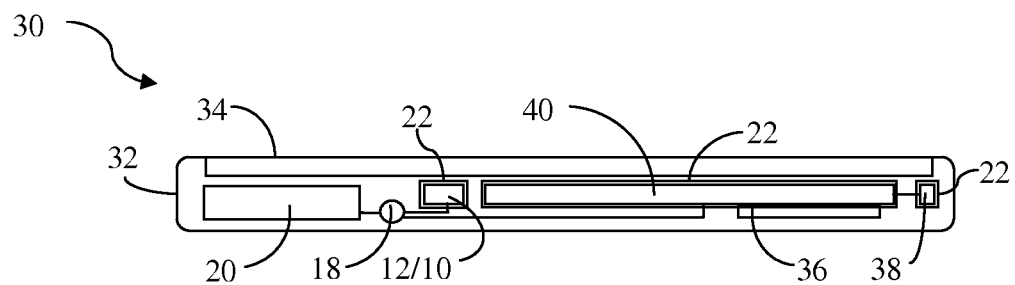
FIG. 2 schematically depicts an embodiment of an electronic device that includes a moisture sensor and, optionally, a moisture response system.

FIG. 2 depicts an embodiment of an electronic device 30 that includes a moisture sensor 12, as well as a housing 32, a display 34, its primary electronic components (e.g., electronic components that enable the electronic device to function as intended, such as processors, wireless communication elements, input and/or output elements, transducers, etc.) and any other electronic and/or mechanical components. In some embodiments, such as that depicted by FIG. 2, the moisture sensor 12 is part of a moisture response system 10, such as that shown in FIG. 1.

The electronic device 30 may comprise a portable electronic device, an electronic device that is expected to be used in an environment where exposure to moisture is likely or even expected, or any of a variety of other types of electronic devices. The housing 32 and display 34 define at least part of an exterior of the electronic device 30. The moisture sensor 12 may, in some embodiments, be located or at least exposed to the exterior of the electronic device 30. In other embodiments, the moisture sensor 12 may be located within an interior of the electronic device 30, along with other components of the moisture response system 10 (FIG. 1), if any, the primary electronic components of the electronic device 30 and a power supply 20, which provides power to various electronic components of the electronic device 30. Without limitation, the primary electronic components of the electronic device 30 may include a processing element 36 (e.g., microprocessor, etc.), a wireless communication system 38 (which may include at least one antenna) and other electronic and/or mechanical components 40 (e.g., transducers, such as speakers, microphones, etc.; vibrators; fans; etc.). In the illustrated embodiment, a switch 18 is disposed between the power supply 20 and the primary electronic components, and between the power supply 20 and the moisture sensor 12 and any other components of the moisture response system 10.

In some embodiments, the electronic device 30 may also include one or more moisture-resistant coatings 22. A moisture-resistant coating 22 may cover all or part of an exterior of the electronic device 30, all or part of surfaces that are internally confined within the electronic device 30 (e.g., surfaces of components or combinations of components within the interior of the electronic device 30, etc.) or both external and internal surfaces.

Various embodiments of methods for responding to exposure of an electronic device 30 to an amount of moisture that meets or exceeds a moisture response threshold (e.g., a predetermined, unsafe level of moisture, such as 95% relative humidity or greater, exposure to water or another electrically conductive material in liquid form, etc.) may include monitoring an amount of moisture to which the electronic device is exposed (e.g., with a moisture sensor 12, etc.). Monitoring may occur continuously or periodically. If the amount of moisture detected (e.g., by the moisture sensor 12, etc.) meets or exceeds the moisture response threshold, a normal operational mode of the electronic device 30 may be terminated, and a moisture response mode of the electronic device 30 may be initiated.

As the electronic device 30 exits its normal operational mode, the supply of power from a power supply 20 to one or more electronic components of the electronic device 30 may be terminated. The moisture-response mode of an electronic device 30 may interrupt charging of a power source of the electronic device 30. In some embodiments, this moisture-response mode of the electronic device 30 may include a complete shut-down of the electronic device 30. In other embodiments, the moisture response mode of the electronic device 30 may comprise a safe mode, in which certain components (e.g., primary electronic components that have been made moisture resistant, components that are unlikely to fail when exposed to moisture, etc.) of the electronic device 30 may continue to operate. In some embodiments, operation of the electronic device 30 in the safe mode may enable the moisture sensor 12 or other components of the moisture response system 10, if any, to continue operation, while the communication of power from the power supply 20 to any primary electronic components that do not participate in the moisture response system may be terminated.

As an electronic device 30 enters the safe mode, or moisture response mode, the electronic device 30 or a moisture response system 10 associated with the electronic device 30 may generate a notification. The notification may include a user-perceptible warning, the generation and transmittal of a signal to a remote monitoring service or a combination of these services. Without limitation, a remote monitoring service may include the manufacturer, vendor or an owner or user of the electronic device, a party that has been engaged to monitor, update, service or repair the electronic device, a party that provides warranty coverage for or insures the electronic device, or any other suitable party.

A user-perceptible warning may be provided by a physical indicator (e.g., sight, sound, motion, etc.) on the electronic device. Alternatively, a warning may be remotely transmitted to a user or a monitoring service (e.g., as a text message, an e-mail, an instant message, a telephone call or any other suitable form of automated electronic communication). Such a warning may merely indicate that a particular electronic device has been exposed to moisture, or it may include other information, such as information about the time at which the electronic device was exposed to moisture, the type of moisture to which the electronic device has been exposed, the extent of exposure, the duration of the exposure, the number of times the electronic device has been exposed to moisture (i.e., a tally), the cumulative duration of exposure of the electronic device to moisture, the geographic location of the electronic device at the time of exposure, warranty information, contact information for the user and/or owner of the electronic device, information on any prior exposure of the electronic device to moisture and any other relevant information about exposure of the electronic device to moisture. With such information, the recipient may use the information themselves or assist the user of the electronic device, record the information that has been received and/or schedule a reminder to follow up with the user.

In embodiments where moisture monitoring continues while an electronic device 30 is in moisture response mode, the electronic device 30 may be allowed to resume full operation once an acceptable level of moisture (e.g., a predetermined reset threshold, an amount of moisture below a predetermined moisture response threshold, etc.) is detected. In such an embodiment, when the amount of moisture detected drops to or below a predetermined reset threshold, a predetermined moisture response threshold or any other suitable reset condition or combination of reset conditions have been met, the moisture response mode of the electronic device 30 may be exited, and the normal operational mode of the electronic device 30 may resume. Resumption of normal, or full, operation of the electronic device 30 may be automatic upon occurrence of the reset condition(s), or resetting of the electronic device 30 may occur when an individual (e.g., a user, an administrator, etc.) causes normal operation of the electronic device 30 to resume (e.g., following an inspection, etc.).

Although the foregoing description contains many specifics, these should not be construed as limiting the scope of any of the appended claims, but merely as providing information pertinent to some specific embodiments that may fall within the scopes of the appended claims. Features from different embodiments may be employed in combination. In addition, other embodiments may also be devised which lie within the scopes of the appended claims. The scope of each claim is, therefore, indicated and limited only by its plain language and the legal equivalents to the recited elements. All additions, deletions and modifications to the disclosed subject matter that fall within the meaning and scopes of the claims are to be embraced by the claims.

What is claimed:

1. An electronic device, comprising:
   a housing defining an exterior of an electronic device and an interior of the electronic device;
   a plurality of electronic components at least partially within the interior of the device, including a processing element;
   a moisture-resistant coating on at least some of the plurality of electronic components, wherein the moisture-resistant coating comprises a poly(p-xylylene) film; and
   a moisture sensor, the processing element and/or the moisture sensor being configured to:
      monitor for exposure of the moisture sensor to moisture;
      cause the electronic device to exit a normal operation mode and to enter into a moisture response mode when the moisture sensor is exposed to an amount of moisture that meets or exceeds a predetermined moisture response threshold, the moisture sensor operating continuously when the electronic device is in the moisture response mode;
      monitor the amount of moisture the moisture sensor is exposed to when the electronic device is in the moisture response mode; and
      automatically cause the electronic device to exit the moisture response mode and to reenter the normal operation mode when the moisture sensor is exposed to an amount of moisture that falls below a predetermined reset threshold.

2. The electronic device of 1, wherein the moisture-resistant coating covers at least a portion of an interior surface of the housing.

3. The electronic device of claim 1, wherein the moisture sensor and/or the processing element is/are configured to send a message to a user of the electronic device upon or after exposure of the moisture sensor to the amount of moisture exceeding the predetermined moisture response threshold.

4. The electronic device of claim 1, wherein the moisture sensor and/or the processing element is/are configured to send a message to a remote monitoring service upon or after exposure of the moisture sensor to the amount of moisture exceeding the predetermined moisture response threshold.

5. An electronic device, comprising:
   a housing defining an exterior of an electronic device and an interior of the electronic device;
   a plurality of electronic components at least partially within the interior of the device, the plurality of electronic components including a processing element;
   a moisture sensor, the processing element and/or the moisture sensor being configured to:
      monitor for exposure of the moisture sensor to moisture;
      cause the electronic device to exit a normal operation mode and to enter into a moisture response mode when the moisture sensor is exposed to an amount of moisture that meets or exceeds a predetermined moisture response threshold; and
      automatically cause the electronic device to exit a moisture response mode and to reenter the normal operation mode when the moisture sensor is exposed to an amount of moisture that falls below a predetermined reset threshold; and
   a moisture-resistant coating on at least some of the electronic components of the plurality of electronic components,
   wherein, in the moisture response mode, electronic components of the plurality of electronic components that are protected by the moisture-resistant coating continue to operate.

6. The electronic device of claim 5, wherein, in the moisture response mode, the moisture sensor operates continuously.

7. The electronic device of claim 5, wherein the moisture-resistant coating comprises a poly(p-xylylene) film.

8. An electronic device, comprising:
   a housing defining an exterior of an electronic device and an interior of the electronic device;
   a plurality of electronic components at least partially within the interior of the device, the plurality of electronic components including a processing element;

a moisture-resistant coating on at least some of the plurality of electronic components, wherein the moisture-resistant coating comprises a poly(p-xylylene) film;

a main power supply;

a moisture response system, including:

a moisture sensor within the housing, the moisture sensor and/or the processing element configured to cause the electronic device to enter into a moisture response mode when the moisture sensor is exposed to an amount of moisture that meets or exceeds a predetermined moisture response threshold;

a switch associated with the moisture sensor and/or the processing element, wherein the switch is configured to electrically isolate one or more electronic components of the plurality of electronic components when the electronic device enters the moisture response mode; and a dedicated power supply separate from the main power supply.

9. The electronic device of claim 8, wherein the switch is configured to prevent communication of power from the main power supply to at least some electronic components of the plurality of electronic components when the electronic device enters into the moisture response mode.

10. The electronic device of claim 8, wherein operation of at least one communication port, a display, a sensor, a camera, a speaker or a microphone of the electronic device is terminated when the electronic device is in the moisture response mode.

11. A moisture response system for use with an electronic device, comprising:

a moisture sensor;

a processing element; and a program configured to be executed by the processing element upon exposure of the moisture sensor to an amount of moisture that meets or exceeds a predetermined moisture response threshold, the program being configured to cause the processing element to cause an electronic device of which the moisture sensor is a part to enter a moisture response mode in which the moisture response system remains continuously active but power is terminated to other electronic components of the electronic device, and wherein the program is configured to cause the processing element to provide the user with information about when a moisture-resistant coating was last applied to components of the electronic device.

12. The moisture response system of claim 11, wherein the program is configured to cause the processing element to provide a user with information about exposure of the electronic device to moisture.

13. The moisture response system of claim 11, wherein the program is configured to cause the processing element to provide the user with information about an amount of moisture to which the electronic device has been exposed.

14. The moisture response system of claim 11, wherein the program is configured to cause the processing element to provide the user with a time at which the electronic device was exposed to moisture, a type of moisture to which the electronic device was exposed, an extent of the exposure of the electronic device to moisture, a duration of the exposure of the electronic device to moisture, and/or a geographic location of the electronic device at the time of exposure.

15. The moisture response system of claim 11, wherein the program is configured to cause the processing element provide the user with instructions on how to minimize moisture-related damage to the electronic device with which the moisture response system is associated.

16. The moisture response system of claim 15, wherein the program is configured to cause the processing element to provide the user with instructions on a protocol for removing moisture from, or drying, the electronic device with which the moisture response system is associated.

17. The moisture response system of claim 11, wherein the program is configured to cause the processing element to provide the user with warranty information, repair information and/or advertisements relating to mitigating effects of potential damage from exposure of the electronic device to moisture.

18. The moisture response system of claim 11, wherein the program is configured to cause the processing element to notify the user of the electronic device that the electronic device requires service.

19. The moisture response system of claim 11, wherein the program is configured to cause the processing element to enable the user to schedule a reminder for the program to follow-up with the user.

20. The moisture response system of claim 11, wherein the program is configured to cause the processing element to maintain a record of the exposure of the electronic device to moisture.

21. The moisture response system of claim 20, wherein the program is configured to cause the processing element to provide the user with information about prior exposure of the electronic device to moisture.

* * * * *